United States Patent
Park et al.

(10) Patent No.: US 8,553,771 B2
(45) Date of Patent: Oct. 8, 2013

(54) DERIVATION PROCESS OF BOUNDARY FILTERING STRENGTH, AND DEBLOCKING FILTERING METHOD AND APPARATUS USING THE DERIVATION PROCESS

(75) Inventors: Gwang Hoon Park, Gyeonggi-do (KR); Min Woo Park, Gyeonggi-do (KR); Doug Young Suh, Gyeonggi-do (KR); Kyu Heon Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 1265 days.

(21) Appl. No.: 11/985,999

(22) Filed: Nov. 19, 2007

(65) Prior Publication Data

US 2008/0144722 A1 Jun. 19, 2008

(30) Foreign Application Priority Data

Dec. 15, 2006 (KR) .................. 10-2006-0128877
Dec. 29, 2006 (KR) .................. 10-2006-0138693
May 3, 2007 (KR) .................. 10-2007-0042897

(51) Int. Cl.
*H04N 11/02* (2006.01)

(52) U.S. Cl.
USPC ............ 375/240.13; 375/240.18; 375/240.25; 375/240.29

(58) Field of Classification Search
None
See application file for complete search history.

(56) References Cited

U.S. PATENT DOCUMENTS 7,372,905 B2 * 5/2008 Foo et al. .................. 375/240.18
8,036,271 B2 * 10/2011 Winger et al. ........... 375/240.16

(Continued)

FOREIGN PATENT DOCUMENTS

WO WO03/026313 3/2003
WO WO 03/026313 9/2003
WO WO 2006/073241 7/2006

OTHER PUBLICATIONS

Lee et al. CE11: Illumination Compensation, Joint Video Team (JVT) of ISO/IEC MPEG & ITU-T VCEG (ISO/IEC JTC1/SC29/WG11 and ITU-T SG16 Q.6) JVT-U052r2, Oct. 20, 2006, URL, http://ftp3.itu.org/av-arch/Jvt-site/2006_Hangzhou/JVT-U052.zip.

(Continued)

*Primary Examiner* — Hassan Phillips
*Assistant Examiner* — Mark A Mais
(74) *Attorney, Agent, or Firm* — Occhiuti Rohlicek & Tsao LLP

(57) ABSTRACT

Provided are a bS derivation process and a deblocking filtering method and apparatus using illumination compensation and/or chrominance compensation, such as a multi-view video coding, in a picture coding/decoding process in which a prediction coding is performed. If neither of the two blocks are intra-coded, neither of the two blocks do contain a none-zero transformed coefficient, and motion compensation for the two blocks is performed based on the identical reference frame and the absolute difference between the horizontal or vertical components of the two motion vectors of the two blocks is less than 1, the bS of the two blocks is derived by considering whether the two blocks are coded by illumination compensation (IC) according to an embodiment of the present invention. Specifically, if both of the two blocks are coded by IC mode or neither of the two blocks are coded by IC mode, bS is set as such a value that filtering is unnecessary. On the other hand, if both of the two blocks are coded by IC mode and the blocks have different illumination change values, or only one of the blocks is coded by IC mode, the bS is derived using difference of illumination change values or the illumination change value.

6 Claims, 10 Drawing Sheets

(56) References Cited

U.S. PATENT DOCUMENTS

| 8,270,474 | B2* | 9/2012 | Kim et al. | 375/240.03 |
|---|---|---|---|---|
| 2003/0053541 | A1 | 3/2003 | Sun et al. | |
| 2004/0071210 | A1 | 4/2004 | Amara et al. | |
| 2004/0179620 | A1* | 9/2004 | Foo et al. | 375/240.27 |
| 2007/0177674 | A1* | 8/2007 | Yang | 375/240.25 |

OTHER PUBLICATIONS

"Description of Core Experiments in Multiview Video Coding", ITU Study Group 16—Video Coding Experts Group, XP030014511, p. 15-18, Apr. 7, 2006.

Lee et al., "CE11: Illumination Compensation", ITU Study Group 16—Video Coding Experts Group, XP030006698, Oct. 26, 2006.

Park et al., Illumination Compensation for Multi-View Video Coding Experts Group, XP030041819, Mar. 30, 2006.

Park et al., "MVC Deblocking for Illumination Compensation", ITU Study Group 16—Video Coding Experts Group XP030006841, p. 1-7, 16, Jan. 10, 2007.

Shim et al., "Deblocking Filter on Illumination Compensation", ITU Study Group 16—Video Coding Experts Group, XP030006859, Jan. 10, 2007.

Yeping et al., "Deblocking Filter Adaptation for MVC", ITU Study Group 16—Video Coding Experts Group, XP030041989, Mar. 30, 2006.

* cited by examiner

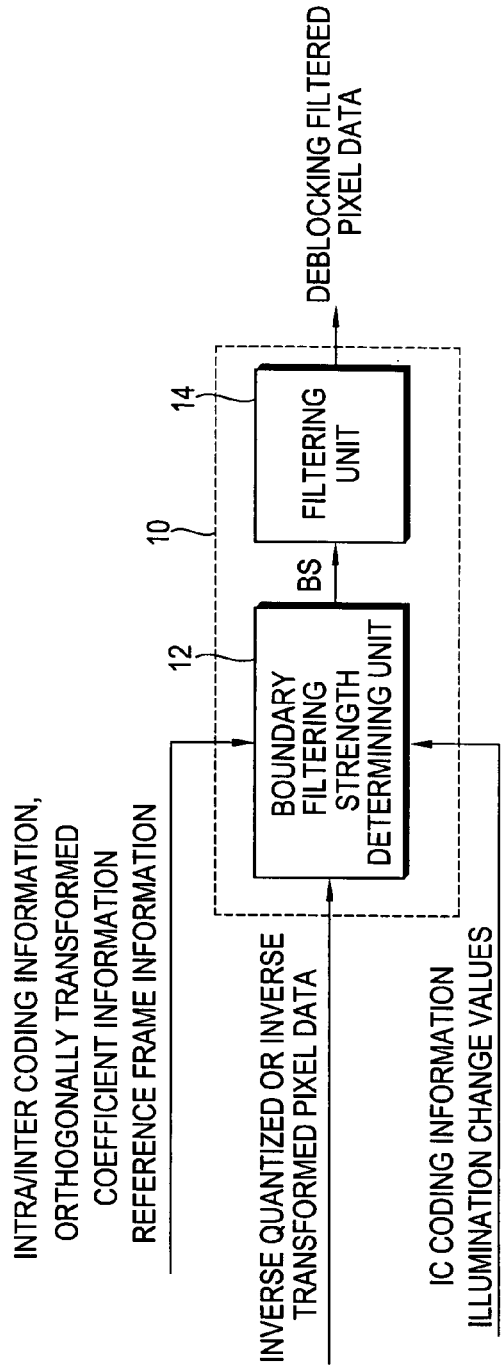

DERIVATION PROCESS OF BOUNDARY FILTERING STRENGTH, AND DEBLOCKING FILTERING METHOD AND APPARATUS USING THE DERIVATION PROCESS

CROSS-REFERENCE TO RELATED PATENT APPLICATIONS

This application claims the benefits of Korean Patent Applications Nos. 10-2006-0128877 filed on Dec. 15, 2006, 10-2006-138693 filed on Dec. 29, 2006, and 10-2007-0042897 filed on May 3, 2007 in the Korean Intellectual Property Office, the disclosures of which are incorporated herein in their entirety by reference.

BACKGROUND OF THE INVENTION

1. Field of the Invention

The present invention relates to a picture coding/decoding, and more particularly, to a derivation process of a boundary filtering strength, a deblocking filtering method and apparatus using the derivation process.

2. Description of the Related Art

Multi-view video coding (MVC) is to process pictures of respective views obtained from a plurality of cameras, that is, to process a multi-view picture. The cameras are separated from one another in various distances and/or various directions with respect to an object according to a predetermined rule. As a result, pictures of respective views which form a multi-view picture are significantly co-related to one another. Accordingly, if such a high correlation between pictures of respective views is appropriately utilized, the coding efficiency of MVC can be substantially improved.

A research into MVC, of which standards are actively under development, is being performed to improve coding efficiency in consideration of characteristics of a multi-view picture described above on the basis of H.264/MPEG-4 part 10 advanced video coding (hereinafter, referred to as H.264/AVC) which is an international standard for motion picture coding. For example, a hierarchical B-pictures coding process, which is performed to support a temporal scalability in joint scalable video coding (JSVC) defined in H.264/AVC, is applied to an intra-view prediction coding process. In addition, in MVC, an inter-view prediction process is also performed in consideration of characteristics of a multi-view picture described above to obtain high coding efficiency.

FIG. 1 shows a prediction structure illustrating a relation between intra-view prediction and inter-view prediction in MVC of which standards are under development. FIG. 1 illustrates 8 views, which means the size of group of pictures (GOP) in a temporal direction is 8 frames. Referring to FIG. 1, S0, S1, S2, S3, . . . , S7 denote views, and T0, T1, T2, T3, . . . , T100 indicate the temporal direction.

Referring to FIG. 1, in each view, a prediction coding process is performed using a hierarchical B-picture structure defined in the H.264/AVC in a temporal direction. Pictures of each view at a first time (T0) and pictures separated from the pictures at T0 in a distance of 8 frames in the temporal direction, that is, pictures separated in a distance corresponding to the size of a group of pictures (GOP), such as pictures at T8, T16, T24, . . . , are only inter-view predicted. Specifically, at T0, T8, T16, T24, . . . , view S2 is predicted from view S0, view S1 is predicted from view S0 and view S2, view S3 is predicted from view S2 and view S4, view S6 is predicted from view S4, view S5 is predicted from view S4 and view S6, and view S7 is predicted from view S6 since view S7 is the final view.

In every second view, that is, views S1, S3, S5, and S7, at other times T1, T2, T3 . . . T7, T9, T10 . . . temporal Intra-view prediction and inter-view prediction are performed. That is, in addition to the temporal intra-view prediction, view S1 is inter-view predicted from view S0 and view S2, view S3 is inter-view predicted from view S2 and view S4, and view S5 is inter-view predicted from view S4 and view S6.

Meanwhile, in general, light reflected from an object may differ according to an orientation, which should be considered to obtain high coding efficiency in MVC. Specifically, an object can be separated from cameras in various distances and/or various directions, and thus even when the object is pictured at identical time, pictures obtained from respective cameras can contain different brightness (also called as illumination) and/or different chrominance. In MVC of which standards are under development, after a difference in illumination and/or chrominance between pictures of respective views is compensated, inter-view prediction coding is performed to obtain high coding efficiency.

Such illumination compensation or chrominance compensation can be applied to, in addition to prediction coding in a view direction, prediction coding in a temporal direction. Prediction coding in the view direction and/or temporal direction in MVC of which standards are under development uses an illumination compensation process and/or a chrominance compensation process. In the illumination compensation process and/or the chrominance compensation process which is performed simultaneously with the motion prediction process, a illumination change value and/or a chrominance change value, which is a difference of illumination and/or chrominance between a current frame (also called as a current block) and a reference frame (also called as a reference block), is obtained and then the difference of the illumination and/or chrominance is applied to a picture of the reference frame.

However, the illumination and/or chrominance compensation process being considered in MVC of which standards are under development is performed in a block unit having a predetermined size, such as in a macroblock or a block unit smaller than the macroblock. Such an illumination compensation process and/or a chrominance compensation process in a block unit may cause blocking artifacts. Accordingly, there is a need to develop a method for eliminating or diminishing the blocking artifacts caused by illumination compensation and/or chrominance compensation. However, such a need is not considered in MVC of which standards are under development.

SUMMARY OF THE INVENTION

The present invention provides a derivation process of a boundary filtering strength (bS) which eliminates or diminishes blocking artifacts caused by illumination compensation (IC) and/or chrominance compensation, and a deblocking filtering method and apparatus method using the derivation process.

The present invention also provides a bS derivation process which efficiently eliminates or diminishes blocking artifacts caused by IC mode or others while the main concept of a conventional deblocking filtering process is not changed, and a deblocking filtering method and apparatus method using the derivation process.

According to an aspect of the present invention, there is provided a bS derivation process for deblocking filtering, comprising: determining whether at least one of two neighboring blocks is intra-coded; if neither of the blocks are intra-coded, determining whether at least one of the two blocks contains an orthogonally transformed coefficient; if neither of the two blocks do contain an orthogonally transformed coefficient, determining whether motion compensation for the two blocks is performed based on different reference frames or otherwise the absolute difference between the horizontal or vertical components of the two motion vectors of the two blocks is greater than or equal to 1; and if motion compensation is performed based on the identical reference frame and the absolute difference between the horizontal or vertical components of the two motion vectors of the two blocks is less than 1, determining whether the two blocks are coded by IC mode.

According to another aspect of the present invention, there is provided bS derivation process for deblocking filtering, comprising: determining a bS of neighboring two blocks. Specifically, the bS derivation process includes determining whether the two blocks are coded by IC mode and determining the bS according to the determination, wherein the determining whether the two blocks are coded by IC mode is performed when neither of the two blocks are intra-coded and contain an orthogonally transformed coefficient, and motion compensation for the two blocks is performed based on the identical reference frame and the absolute difference between the horizontal or vertical components of the two motion vectors of the two blocks is less than 1.

According to another aspect of the present invention, there is provided a deblocking filtering method including: a bS derivation process for neighboring two blocks; and a process for applying filtering with respect to pixel values of the two blocks according to the derived bS, wherein the bS derivation process comprises: determining whether at least one of two neighboring blocks is intra-coded; if neither of the blocks are intra-coded, determining whether at least one of the two blocks contains an orthogonally transformed coefficient; if neither of the two blocks do contain an orthogonally transformed coefficient, determining whether motion compensation for the two blocks is performed based on different reference frames or otherwise the absolute difference between the horizontal or vertical components of the two motion vectors of the two blocks is greater than or equal to 1; and if motion compensation is performed based on the identical reference frame and the absolute difference between the horizontal or vertical components of the two motion vectors of the two blocks is less than 1, determining whether the two blocks are coded by IC mode.

According to another aspect of the present invention, there is provided a deblocking filtering apparatus including: a bS derivation unit deriving a bS of two neighboring blocks; and a filtering unit which applies filtering with respect to pixel values of the two blocks according to the bS output from the bS dervation unit, wherein the bS derivation process includes: determining whether at least one of two neighboring blocks is intra-coded; if neither of the blocks are intra-coded, determining whether at least one of the two blocks contains an orthogonally transformed coefficient; if neither of the two blocks do contain an orthogonally transformed coefficient, determining whether motion compensation for the two blocks is performed based on different reference frames or otherwise the absolute difference between the horizontal or vertical components of the two motion vectors of the two blocks is greater than or equal to 1; and if motion compensation is performed based on the identical reference frame and the absolute difference between the horizontal or vertical components of the two motion vectors of the two blocks is less than 1, determining whether the two blocks are coded by IC mode.

According to another aspect of the present invention, there is provided a deblocking filtering method including: a bS derivation process for neighboring two blocks; and a process for applying filtering with respect to pixel values of the two blocks according to the derived bS, wherein the bS derivation process including: determining whether the two blocks are coded by IC mode when neither of the blocks are intra-coded, neither of the two blocks do contain an orthogonally transformed coefficient, and motion compensation for the two blocks is performed based on the identical reference frame and the absolute difference between the horizontal or vertical components of the two motion vectors of the two blocks is less than 1; and assigning a bS such a value that boundary filtering is unnecessary when both of the two blocks are coded by IC mode and the blocks have identical illumination change values, or neither of the two blocks are not coded by IC mode.

According to another aspect of the present invention, there is provided a bS derivation process including: determining whether at least one of neighboring two blocks is intra-coded; if neither of the two blocks are intra-coded, determining whether at least one of the two blocks contains an orthogonally transformed coefficient; if neither of the two blocks do contain an orthogonally transformed coefficient, determining whether motion compensation for the two blocks is performed based on different reference frames or otherwise the absolute difference between the horizontal or vertical components of the two motion vectors of the two blocks is greater than or equal to 1; and if motion compensation is performed based on the identical reference frame and the absolute difference between the horizontal or vertical components of the two motion vectors of the two blocks is less than 1, determining whether both the two block are coded by IC mode and the blocks have different illumination change values, or only one of the two blocks is coded by IC mode; and if both of the blocks are coded by IC mode and the blocks have different illumination change values, or only one of the two blocks is coded by IC mode, a bS is derived using a difference of illumination change values of the two blocks or the illumination change value of the IC coded block.

BRIEF DESCRIPTION OF THE DRAWINGS

The above and other features and advantages of the present invention will become more apparent by describing in detail exemplary embodiments thereof with reference to the attached drawings in which:

FIG. 10 shows a block diagram of a deblocking filtering apparatus according to an embodiment of the present invention.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In embodiments and the drawings, respective elements are denoted by designation numerals for convenience.

As described above, when a picture is coded in a block unit, blocking artifacts may occur. Blocking artifacts can be eliminated or diminished using, for example, a deblocking filtering method which is defined in H.264/AVC standard. According to the deblocking filtering method, first, a boundary filtering strength (bS) derivation process is performed to assort the degree of filtering and then pixel values of neighboring blocks are filtered on the basis of the derived bS. However, since the deblocking filtering method is suitable for single-view video coding which does not consider illumination compensation and/or chrominance compensation, the deblocking filtering method cannot be applied to multi-view video coding (MVC) which considers illumination compensation and/or chrominance compensation.

Figure 2:
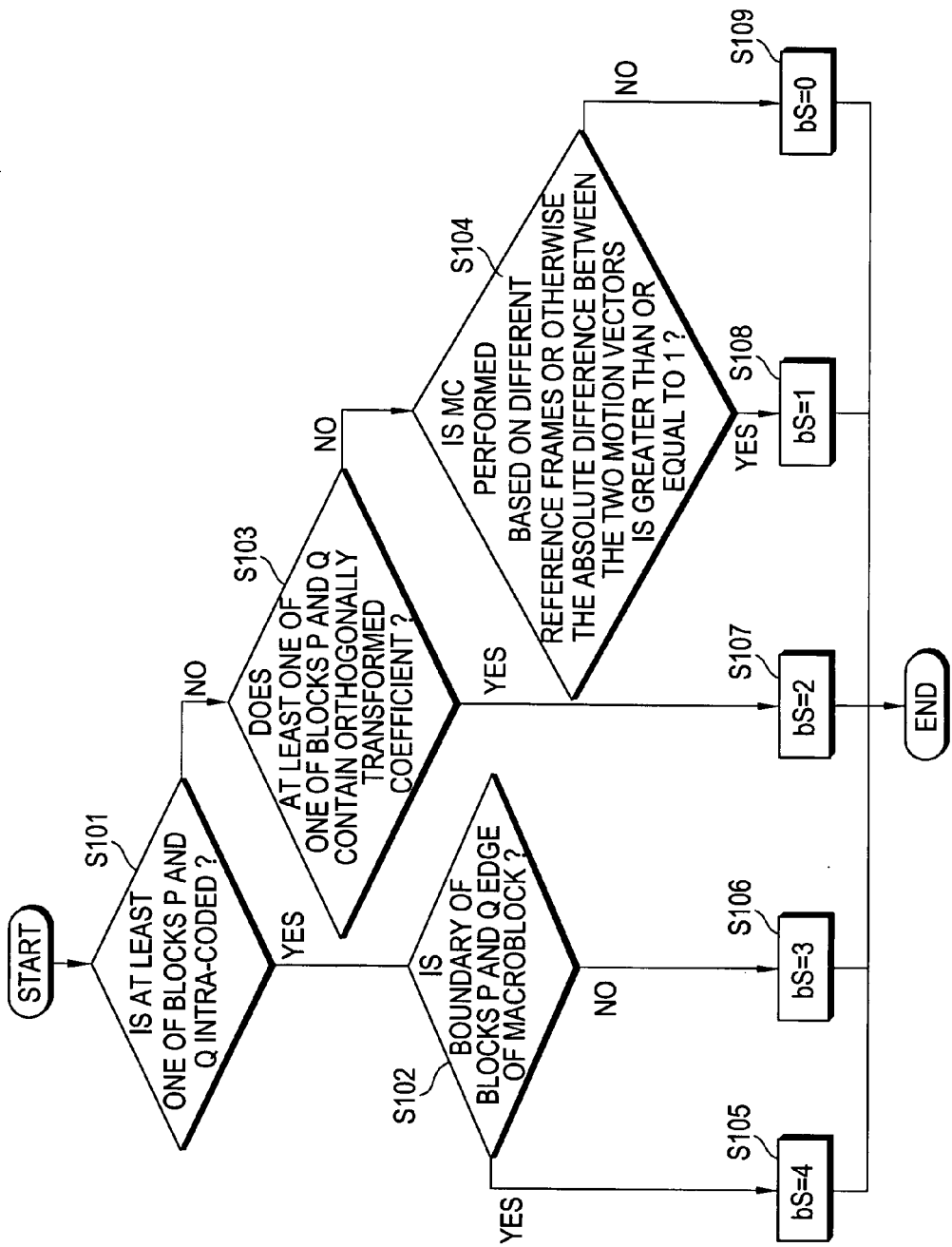
FIG. 2 shows a flow chart illustrating a boundary filtering process for MVC.

Meanwhile, application of a conventional deblocking filtering method defined in a H.264/AVC standard on MVC of which standards are under development is being considered. FIG. 2 shows a flow chart illustrating a bS derivation process in a deblocking filtering method which is considered to apply to MVC. The bS derivation process will now be described in detail with reference to FIG. 2.

Referring to FIG. 2, it is determined whether at least one of neighboring blocks p and q is intra-coded (S101). Herein, what block p or block q is intra-coded or inter-coded may mean that block p or block q directs an intra-coded macroblock or belongs to the intra-coded macroblock.

Figure 3:
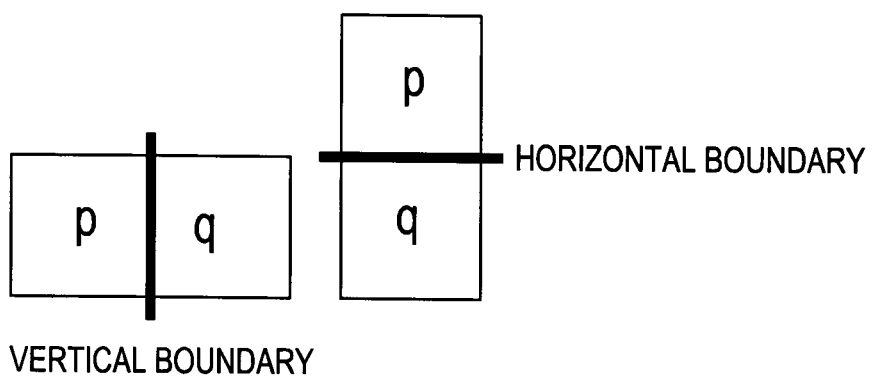
FIG. 3 is a view illustrating a correlation between blocks p and q used in deblocking filtering.

The correlation of blocks p and q is illustrated in FIG. 3. Referring to FIG. 3, block p is a block located left or up side of the block boundary of blocks p and q, and block q is a block located right or down side of the block boundary of blocks p and q. If at least one of blocks p and q is intra-coded in Step S101, Step S102 is performed. Otherwise, if both of the blocks p and q are inter-coded in Step S101, Step S103 is performed. Herein, the inter coding is a type of prediction coding which uses as a reference frame a picture of a reconstructed frame having a different time and/or view from the current frame.

If at least one of blocks p and q is intra-coded in Step S101, it is determined whether a boundary of blocks p and q is an edge of a macroblock (MB) (S102). If the boundary of blocks p and q is the edge of a MB, bS is set as 4 (S105). Otherwise, if the boundary of blocks p and q is not the edge of a MB, bS is set as 3 (S106). When bS is set as 4, the strongest filtering is performed in the subsequent filtering application process. As bS has smaller values, weaker filtering is performed.

If both of the blocks p and q are inter-coded blocks in Step S101, it is determined whether at least one of blocks p and q contains an orthogonally transformed coefficient (S103). The orthogonally transformed coefficient is also called as a coded coefficient or a non-zero transformed coefficient. If at least one of blocks p and q contains an orthogonally transformed coefficient, bS is set as 2 (S107). Otherwise, if neither of the blocks p and q contains an orthogonally transformed coefficient, Step S104 is performed.

Step S104 includes determining whether motion compensation (MC) for the two blocks p and q is performed based on different reference frames or otherwise the absolute difference between the horizontal or vertical components of the two motion vectors of the two blocks is greater than or equal to 1(S104). Herein, the phrase 'MC is performed based on different reference frames' may mean that the MC is performed based on different kinds of reference frames and/or that the MC is performed based on a different number of reference frames. If motion compensation is performed based on different reference frames or otherwise the absolute difference is greater than or equal to 1, bS is set as 1(S108). Otherwise, if motion compensation for the two blocks p and q is performed based on the identical reference frame and the absolute difference between the horizontal or vertical components of the two motion vectors of the two blocks is less than 1, bS is set as 0 (S109). When bS is set as 0, the filtering is not performed in the subsequent filtering application process.

Figure 1:
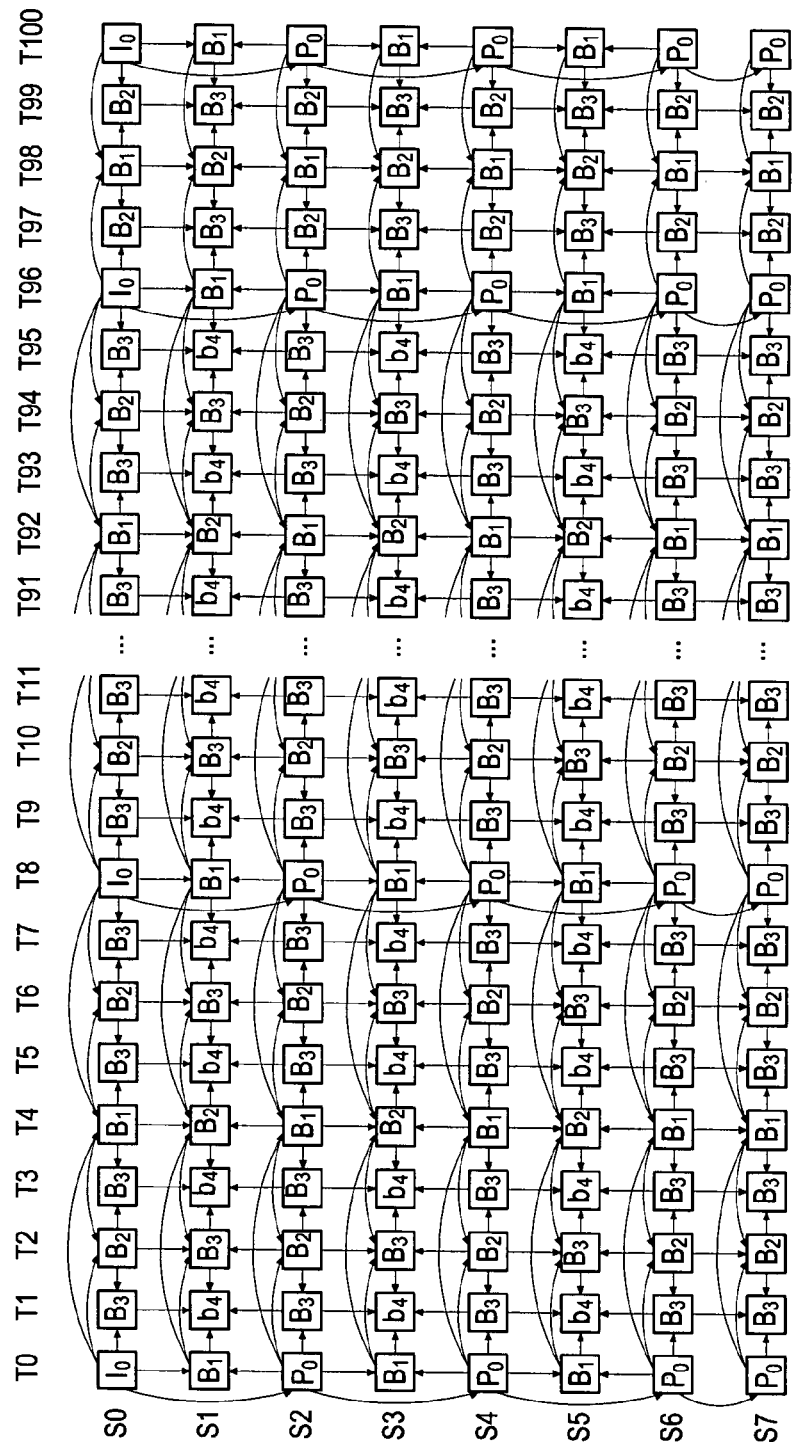
FIG. 1 is a block diagram illustrating an example of a prediction structure in a multi-view video coding (MVC)

As described above, the bS derivation process in the deblocking filtering method for MVC does not consider whether a block to be processed is coded by illumination compensation or chrominance compensation. On the other hand, as described with reference to FIG. 1, when MVC prediction coding in a view direction and/or temporal direction is performed, illumination compensation and/or chrominance compensation is performed to improve a coding efficiency. As described above, if the prediction coding in a view direction or temporal direction considers illumination compensation and/or chrominance compensation and the deblocking filtering method does not consider illumination compensation and/or chrominance compensation, blocking artifacts cannot be completely eliminated or effectively diminished through the deblocking filtering method.

Hereinafter, embodiments of the present invention introduce a method and apparatus for completely eliminating or diminishing blocking artifacts, in an image coding/decoding process, such as MVC in which coding is performed using illumination compensation and/or chrominance compensation. The present invention will be described with reference to deblocking filtering with respect to illumination values. However, it would have been obvious to one of ordinary skill in the art that the present invention is not limited to deblocking filtering with respect to illumination values.

First Embodiment

Figure 4:
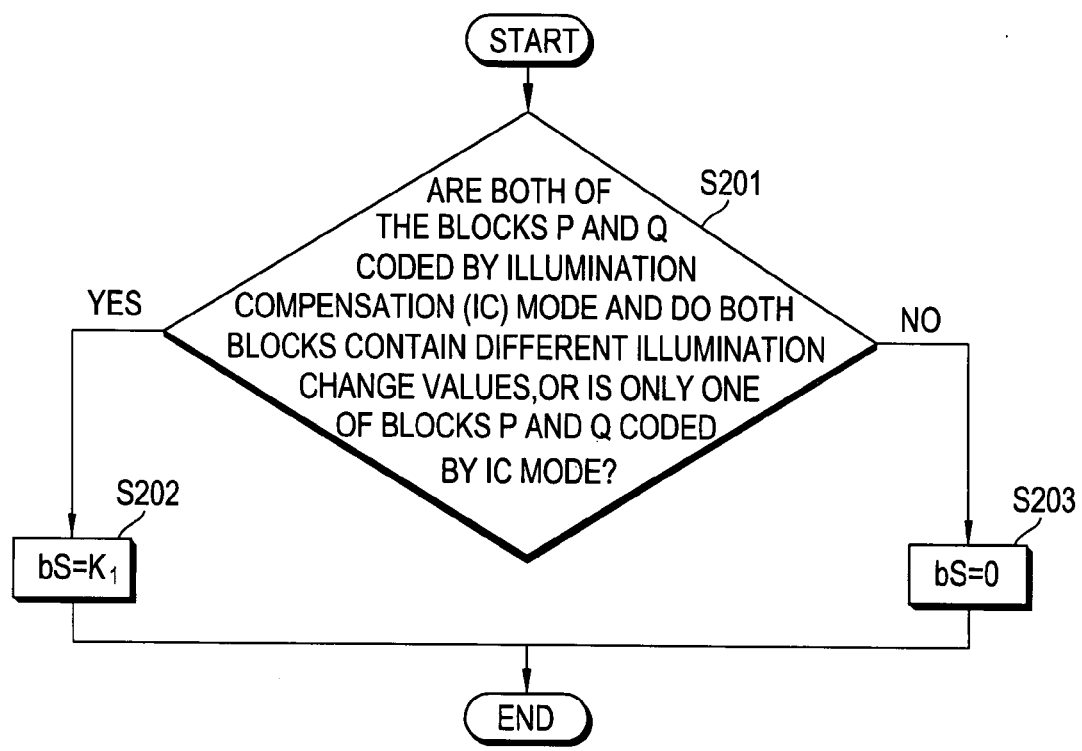
FIG. 4 shows an example of a flow chart illustrating a boundary filtering strength (bS) derivation process in a deblocking filtering method according to a first embodiment of the present invention.

FIG. 4 shows a flow chart illustrating a bS derivation process in a deblocking filtering method according to a first embodiment of the present invention.

Referring to FIG. 4, first, it is determined whether both neighboring blocks p and q are coded by illumination compensation (IC) mode and the blocks p and q have different illumination change values, or only one of blocks p and q is coded by IC mode (S201). Herein, IC mode is a type of prediction coding in a view or temporal direction by which illumination compensation is applied to blocks p and q or a block including blocks p and q.

If both of the neighboring blocks p and q are coded by IC mode and the blocks contain different illumination change values, or only one of blocks p and block q is coded by IC mode, bS is set as a non-zero predetermined value (K1) (S202). For example, K1 can be an integer ranging from 1 to 4 as defined in H.264/AVC. On the other hand, if neither of the blocks p and q are coded by IC mode, or both of the blocks p and q are coded by IC mode and both of the blocks p and q contain identical illumination change values, bS is set as 0 (S203). Herein, when bS is set as 0, the filtering is not performed in a filtering application process.

K1, which represents bS, can be a predetermined value, for example, an integer ranging from 1 to 4. Alternatively, if both of the blocks p and q are coded by IC mode, K1 can be two or more variable according to a difference of illumination change values of blocks p and q, that is, an absolute difference of illumination change values of blocks p and q; if only one of blocks p and q is coded by IC mode, K1 can be two or more variable according to a illumination change value (or illumination change absolute value) of the block. For example, if a difference of illumination change values or an illumination change value is equal to or greater than a predetermined threshold value, for example, 5, K1 is set as 3, otherwise if a difference of illumination change values or an illumination change value is less than the threshold value, K1 is set as 1. As described later, a simulation process in which the threshold value is set as 5 and K1 is set as 1 or 3 based on the threshold value is performed. Results of the simulation process using an MVC test picture show that the picture quality is improved.

Figure 5:
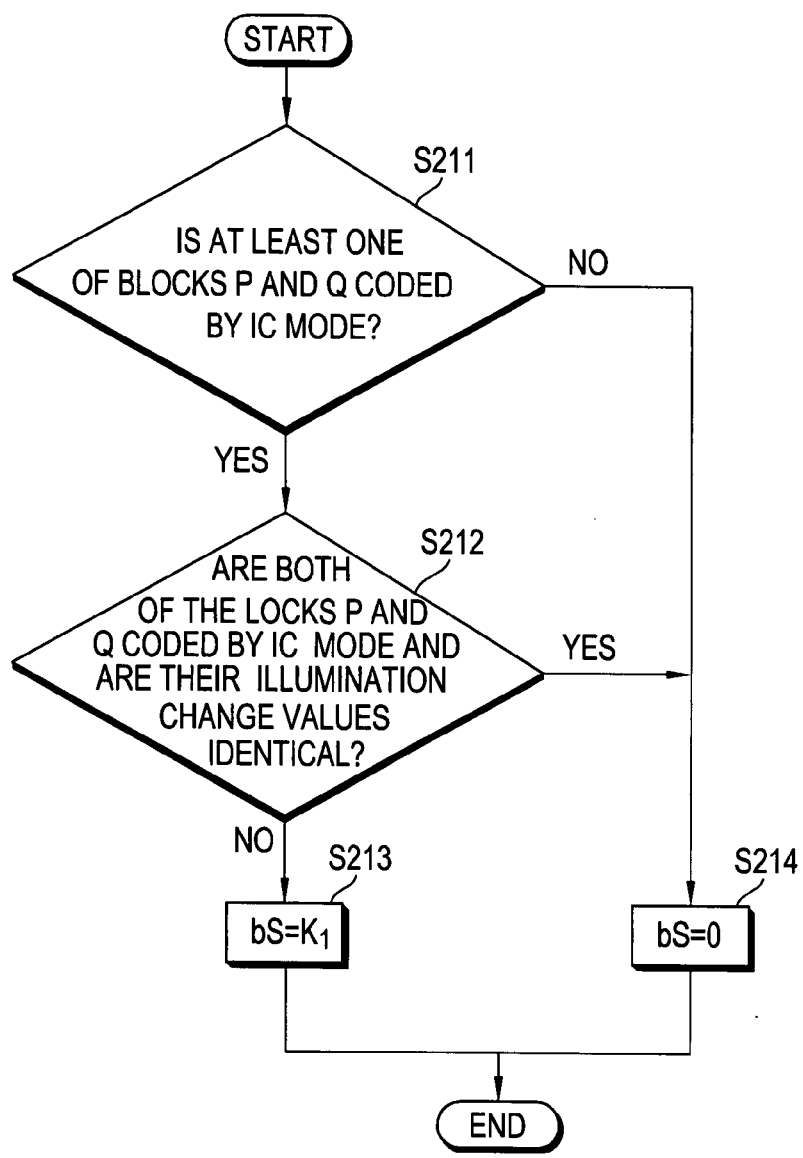
FIG. 5 shows another example of a flow chart illustrating a bS derivation process in a deblocking filtering method according to the first embodiment of the present invention.

FIG. 5 shows another example of a flow chart illustrating a bS derivation process in a deblocking filtering method according to the first embodiment of the present invention. The current embodiment is different from the previous embodiment which has been described with reference to FIG. 4 in a few determining processes to derive bS.

Referring to FIG. 5, first, it is determined whether at least one of blocks p and q is coded by IC mode (S211). If neither of the blocks p and q is coded by IC mode, bS is set as 0 (S214). Otherwise, if at least one of blocks p and q is coded by IC mode, Step S212 is performed. Step S212 includes determining whether both of the blocks p and q are coded by IC mode and their illumination change values are identical (S212). If both of the blocks p and q are coded by IC mode and their illumination change values are identical, bS is set as 0, otherwise bS is set as a non-zero predetermined value (K1). Herein, K1 can be a determined value or can be a variable according to a difference of illumination change values or an illumination change value.

Second Embodiment

The bS derivation process according to the first embodiment and a deblocking filtering method using identical can eliminate or diminish blocking artifacts caused by illumination compensation alone. In consideration that there is a conventional deblocking filtering method, the issue is how to combine the first embodiment of the present invention described above and the conventional deblocking process in a picture coding/decoding process, because the combining method may substantially affect an coding efficiency and/or picture quality.

For example, the deblocking filtering method according to the first embodiment can be performed together with the conventional deblocking filtering method, such as a deblocking filtering method of H.264/AVC. Specifically, the deblocking filtering method according to the first embodiment can be performed before or after the conventional deblocking filtering method. However, this combining method may result in adverse effects. That is, efficiency can be degraded because a deblocking filtering method should be performed twice in a coding or decoding process, or filtering effects can be offset due to double deblocking filtering.

In order to address this problem, a process of determining whether IC is performed can be considered in the conventional deblocking filtering method, which is an integrated deblocking filtering method. For example, a conventional deblocking filtering method, specifically, conventional determining procedures which have been considered in a bS derivation process can be performed together with a process determining whether coding is performed by IC mode, and then, a filtering application process can be performed once. Thus, the coding can be effectively performed.

Even in this method, however, the efficiency of coding is affected by when IC coding is considered and/or how to consider IC coding in a conventional bS derivation process. So, there is a need to combine a conventional bS derivation algorism with determining procedures which have been described according to the first embodiment in such a way that the deblocking filtering effect can be maximized. As described later, the IC coding which has been described according to the first embodiment is considered at the final step of an algorism of a conventional bS derivation process, that is, only when bS is set as 0 in a bS derivation process defined according to H.264/AVC standard. In addition, according to the current embodiment, bS is appropriately derived on the basis of a difference of illumination change values or an illumination change value of a certain block in order to effectively improve the picture quality.

As described above, the first embodiment is applied to the current embodiment only when a specific condition (bS=0 in H.264/AVC) is satisfied in a conventional bS derivation process, which is identified as the most effective method in consideration of elimination or diminishment of blocking artifacts and coding efficiency based on data of the simulation process.

Inventors of the present invention found through simulation results that when a conventional deblocking filtering method is applied to MVC, blocking artifacts significantly appear in blocks having a boundary condition of bS=0. Table 1 shows an example of with respect to a quantization parameter, frequencies of the bS which is applied to neighboring IC blocks out of blocks which form the $191^{st}$ frame of a picture sequence Ballroom, which is one of MVC test picture sequence having quarter video graphics array (QVGA). The bS is obtained using the bS derivation process which has been described with reference to FIG. 2. Referring to Table 1, although there is a difference in frequencies according to a quantization parameter, almost 80% or more of IC blocks have been assigned the bS as ZERO or ONE. In addition, around 44% to 50% of IC blocks contains a boundary condition of bS=0 so that deblocking filtering is not applied.

TABLE 1

| QP = 37 | | | QP = 32 | | | QP = 27 | | | QP = 22 | | |
| --- | --- | --- | --- | --- | --- | --- | --- | --- | --- | --- | --- |
| bS | Frequency | | bS | Frequency | | bS | Frequency | | bS | Frequency | |
| 0 | 111889 | 44% | 0 | 223548 | 45% | 0 | 448742 | 50% | 0 | 649436 | 49% |
| 1 | 116533 | 46% | 1 | 204582 | 41% | 1 | 291569 | 32% | 1 | 366026 | 28% |
| 2 | 20334 | 8% | 2 | 62062 | 12% | 2 | 146965 | 16% | 2 | 286238 | 22% |
| 3 | 0 | 0% | 3 | 0 | 0% | 3 | 0 | 0% | 3 | 0 | 0% |
| 4 | 6468 | 3% | 4 | 10388 | 2% | 4 | 13420 | 1% | 4 | 17540 | 1% |

Referring to Table 1, the filtering is not applied on about 50% of IC blocks, thereby, objective picture qualities are decreased due to blocking artifacts. In addition, inventors of the present invention also found blocking artifacts in such blocks in a test picture of Table 1 obtained through a simulation process. Furthermore, it is also found that when bS is set as 1, blocking artifacts do not appear.

Such results were identified using other simulation data obtained using other test picture. For example, identical results appear in a $12^{th}$ picture of the picture sequence Ballroom and in Exit QVGA sequence $3^{rd}$ view, $12^{th}$ frame. That is, blocking artifacts substantially appear in blocks having a boundary condition of bS=0 according to the algorithm of H.264/AVC.

Accordingly, according to the present invention, only when neighboring two blocks are inter-coded, the bS is derived by taking into consideration whether IC is performed when those blocks are coded. According to an embodiment of the present invention, when neighboring two blocks are inter-coded and the bS is set as 0 based on H.264/AVC, that is, when neither of the two blocks do contain an orthogonally transformed coefficient and motion compensation (MC) for the two blocks is performed based on the identical reference frame and the absolute difference between the horizontal or vertical components of the two motion vectors of the two blocks is less than 1, the bS is derived by taking into account whether the two blocks are coded by IC mode. According to the current embodiment, when at least one of the two blocks is intra-coded, when both of the blocks are inter-coded and at least one block contains an orthogonally transformed coefficient, or when neither of the blocks contain an orthogonally transformed coefficient and motion compensation for the two blocks is performed based on different reference frames or otherwise the absolute difference between the horizontal or vertical components of the two motion vectors of the two blocks is greater than or equal to 1, a bS derivation process does not consider whether the two blocks are coded by IC mode.

A bS derivation process in a deblocking filtering method according to a second embodiment of the present invention will now be described in detail with reference to the related drawings. The current embodiment is based on a deblocking filtering method defined by H.264/AVC. The bS derived according to the current embodiment can be used for filtering in identical manner as defined by H.264/AVC. However, the filtering application method according to the present invention is not limited thereto. In the present specification, the filtering application method is not described in detail.

Figure 6:
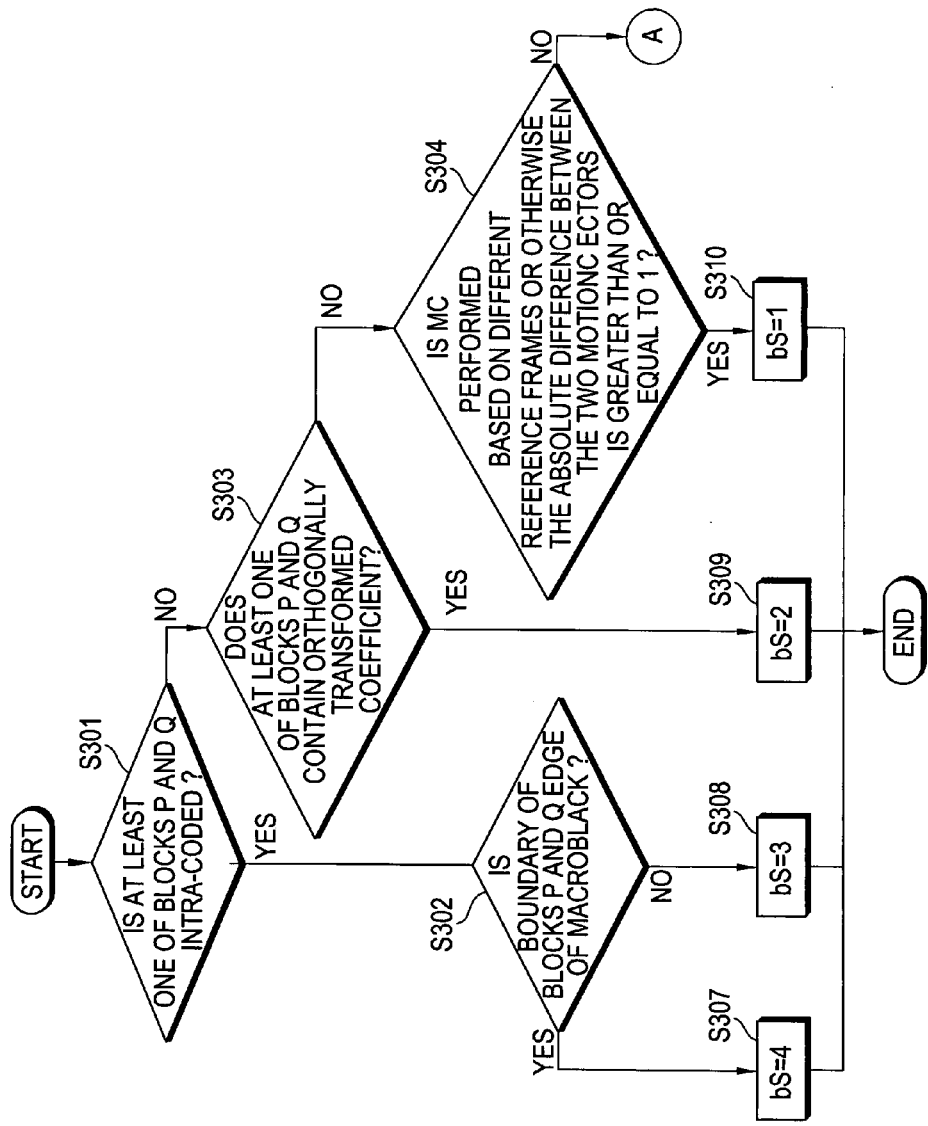
FIGS. 6 and 7 show an example of flow charts illustrating a bS derivation process in a deblocking filtering method according to a second embodiment of the present invention.
Figure 7:
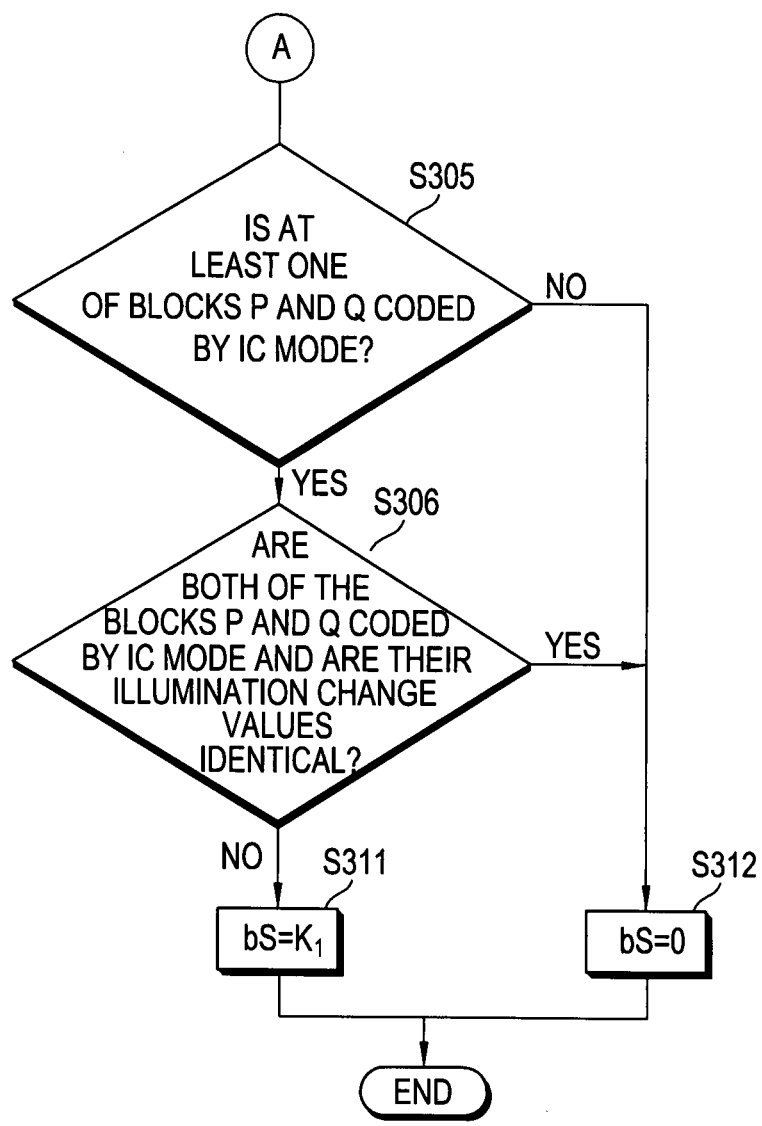

FIGS. 6 and 7 show an example of flow charts illustrating a bS derivation process in a deblocking filtering method according to the second embodiment of the present invention.

Referring to FIG. 6, first, it is determined whether at least one of blocks p and q is intra-coded (S301). Herein, whether block p or block q is intra-coded can be determined by identifying whether a macroblock including block p or block q is intra-coded. If at least one of blocks p and q is intra-coded, Step S302 is performed, otherwise Step S303 is performed. Step S302 includes determining whether a boundary of blocks p and q is a MB edge (S302). If the boundary of blocks p and q is a MB edge, bS is set as 4 (S307), otherwise bS is set as 3 (S308). Step S303 includes determining whether at least one of blocks p and q contains an orthogonally transformed coefficient (S303). If at least one of blocks p and q contains an orthogonally transformed coefficient, bS is set as 2 (S309), otherwise Step S304 is performed. Step S304 includes determining whether motion compensation for the two blocks is performed based on different reference frames or otherwise the absolute difference between the horizontal or vertical components of the two motion vectors of the two blocks is greater than or equal to 1. If motion compensation for the two blocks p and q is performed based on different reference frames or the absolute difference between the horizontal or vertical components of the two motion vectors of the two blocks p and q is greater than or equal to 1, bS is set as 1 (S310). If motion compensation for the two blocks p and q is performed based on the identical reference frame and the absolute difference between the horizontal or vertical components of the two motion vectors of the two blocks p and q is less than 1, bS is not set as 0 which is different from a conventional method, and other processes continue as illustrated in FIG. 7.

Referring to FIG. 7, it is determined whether at least one of blocks p and q is coded by IC mode (S305). If neither of the blocks p and q is coded by IC mode, bS is set as 0 and the bS derivation process ends (S312). However, if at least one of blocks p and q is coded by IC mode, Step S306 is performed.

Step S306 includes determining whether both of the blocks p and q are coded by IC mode and their illumination change values are identical. If both of the blocks p and q are coded by IC mode and their illumination change values are identical, bS is set as 0 and the bS derivation process ends (S312). Otherwise, if only one of blocks p and q is coded by IC mode, or if both blocks p and q are coded by IC mode and the blocks p and q contain different illumination change values, bS is set as a none-zero predetermined value (K1) (S311).

As described above, according to the current embodiment, even when the bS of blocks p and q should be derived to 0 in H.264/AVC, the bS is derived only after determining whether the blocks p and q are coded by IC mode and the blocks p and q contain different illumination change values, or whether only one of the blocks p and q is coded by IC mode. If the blocks p and q are coded by IC mode and the blocks p and q contain different illumination change values or only one of the blocks p and q is coded by IC mode, the bS is set as a none-zero predetermined value (K1) and thus filtering is performed with a corresponding filtering strength. Otherwise, if both of the blocks p and q are coded by IC mode and the blocks p and q contain identical illumination change values, the bS is set as 0 like the conventional case, and thus filtering is not performed.

According to an embodiment of the present invention, K1 can be a predetermined value and the subsequent filtering application process can be performed with a constant strength. According to another embodiment of the present invention, K1 can be a variable according to a certain condition and in this case, the subsequent filtering application process can be performed with various filtering strengths. For example, when both of the blocks p and q are coded by IC mode, the bS can be adaptablely derived according to a difference of illumination change values; on the other hand, when only one of blocks p and q is coded by IC mode, the bS can be adaptablely derived according to the size (absolute value) of illumination change value of the block. In these cases, when the difference of illumination change values or the illumination change value is large, strong filtering is performed, on the other hand, when the difference of illumination change values or the illumination change value is small, weak filtering can be performed. As described with reference the first embodiment, if the difference of illumination change values or the illumination change value is greater than a predetermined threshold value, for example, if K1 is 5 or more, K1 is set as 3 and strong filtering is performed. On the other hand, if the difference of illumination change values or the illumination change value is less than 5, K1 is set as 1 and weak filtering is performed.

Figure 8:
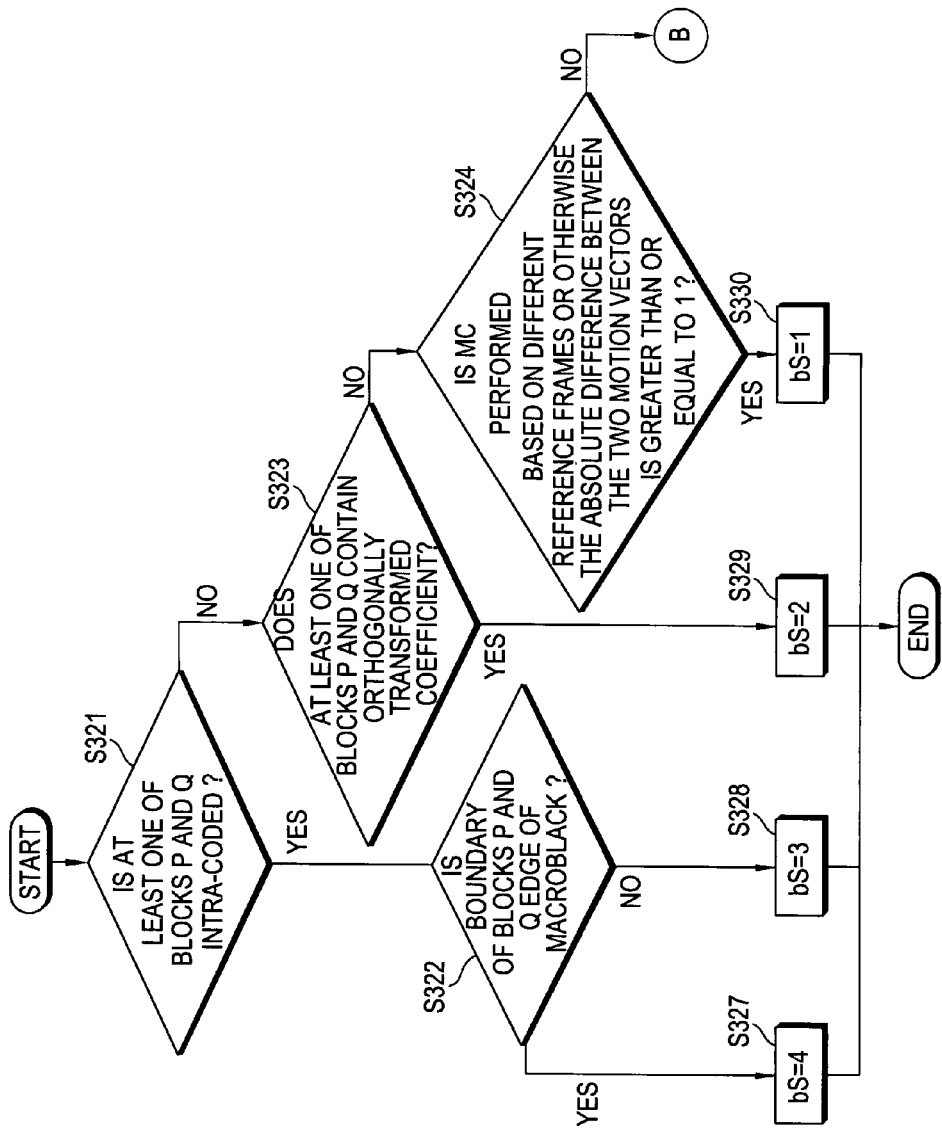
FIGS. 8 and 9 show another example of flow charts illustrating a bS derivation process in a deblocking filtering method according to the second embodiment of the present invention.
Figure 9:
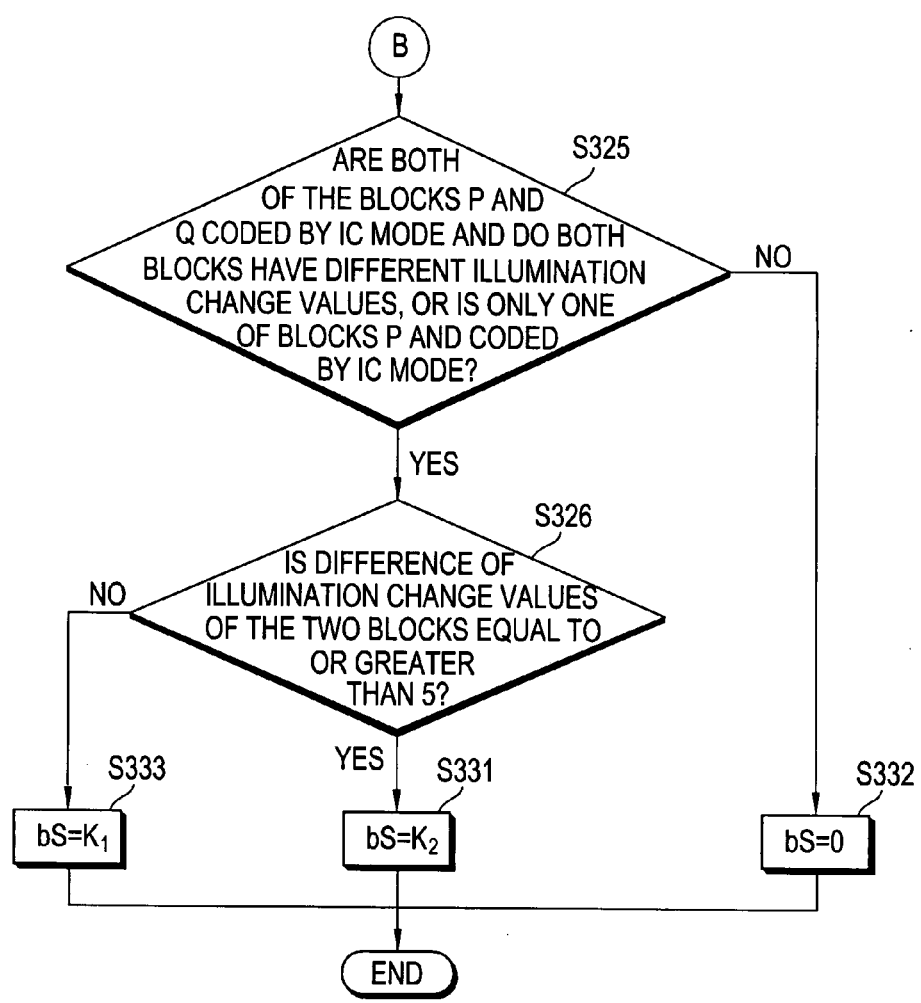

FIGS. 8 and 9 show another example of flow charts illustrating a bS derivation process in a deblocking filtering method according to the second embodiment of the present invention.

Referring to FIGS. 8 and 9, steps S321 through S324 and S327 through S330 are identical as steps S301 through S304 and S307 through S310 which are illustrated in FIGS. 6 and 7. So, only the difference between the bS derivation processes according to the first and second embodiments will now be described in detail.

Referring to FIG. 9, if Step S325 is performed after Step S324. That is, if both of the blocks p and q are inter-coded, neither of the blocks p and q do contain a none-zero transformed coefficient, and the absolute difference between the horizontal or vertical components of the two motion vectors of the two blocks p and q is less than 1 and motion compensation is performed based on the identical reference frame, it is determined whether both of the blocks p and q are coded by IC mode and the blocks contain different illumination change values, or only one of blocks p and q is coded by IC mode (S325). If both of the blocks p and q are coded by IC mode and the blocks contain different illumination change values, or only one of blocks p and q is coded by IC mode, Step S326 is performed, otherwise bS is set as 0 (S333).

Step S326 includes determining whether when only one of blocks p and q is coded by IC mode, the illumination change value is equal to or greater than a predetermined threshold value (T1), or when both of the blocks p and q are coded by IC mode, the difference of illumination change values of the two blocks is equal to or greater than a predetermined threshold value (T1) (S326). If the illumination change value or the difference of illumination change values is equal to or greater than a predetermined threshold value (T1), bS is set as K2 (S331). On the other hand, the illumination change value or the difference of illumination change values is less than the threshold value (T1), bS is set as K1 which is less than K2 (S332). In this case, the threshold value (T1)=5, K1=1, and K2=3. However, the current embodiment is not limited thereto.

FIG. 10 shows a block diagram of a deblocking filtering apparatus 10 according to an embodiment of the present invention. The deblocking filtering apparatus 10 can be included in a coding or decoding apparatus for MVC. The sum of pixel residue data and prediction pixel data output from inverse quantizing or inverse transforming unit of the coding or decoding apparatus can be input to the deblocking filtering apparatus 10. The coding or decoding apparatus includes a unit for performing illumination compensation and/or chrominance compensation when prediction coding is performed in a view direction and/or temporal direction or decoding is performed.

Referring to FIG. 10, the deblocking filtering apparatus 10 includes a bS derivation unit 12 and a filtering unit 14. The bS derivation unit 12 derives the bS of blocks p and q according to the embodiment of the present invention which has been described with reference to FIGS. 4 through 7. To the bS derivation unit 12, information required to derive bS, for example, information defined in H.264/AVC, that is, the information on whether blocks p and q are intra-coded or inter-coded, the information whether the orthogonally transformed coefficient is contained, the information on a reference frame, the information on a motion vector value, the information on whether IC is performed on blocks p and q, and/or the information on the illumination change value of a block when IC is performed on the block is input. Then, the bS derivation unit 12 outputs the derived bS. The bS derivation process which is performed by the bS derivation unit 12 is described above.

The filtering unit 14 performs deblocking filtering with respect to blocks p and q based on the bS input from the bS derivation unit 12. The filtering method which is performed by the filtering unit 14 is not limited. For example, the filtering can be performed based on H.264/AVC. Pixel values of inverse quantized and inverse transformed blocks p and q are input to the filtering unit 14.

As described above, according to the present invention, blocking artifacts caused by illumination compensation and/or chrominance compensation can be eliminated or diminished. According to the present invention, blocking artifacts caused by illumination compensation or others can be effectively removed while the main concept of a conventional deblocking filtering process is not changed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A boundary filtering strength (bS) derivation process for deblocking filtering, comprising:
    determining by a deblocking filtering apparatus whether at least one of two neighboring blocks is intra-coded;
    if neither of the blocks are intra-coded, determining by the deblocking filtering apparatus whether at least one of the two blocks contains a transformed coefficient;
    if neither of the two blocks do contain transformed coefficient, determining by the deblocking filtering apparatus whether motion compensation for the two blocks is performed based on different reference frames or otherwise the absolute difference between the horizontal or vertical components of the two motion vectors of the two blocks is greater than or equal to 1; and
    if motion compensation for the two blocks is performed based on the identical reference frame and the absolute difference between the horizontal or vertical components of the two motion vectors of the two blocks is less than 1, determining by the deblocking filtering apparatus whether the two blocks are coded by illumination compensation (IC) mode,
    wherein the determining whether the two blocks are coded by IC mode comprises determining whether both of the blocks are coded by IC mode and the blocks have different illumination change values, or only one of the two blocks is coded by IC mode,
    and if both of the blocks are coded by IC mode and the blocks have different illumination change values, the bS of deblocking filtering for the boundary between both of the blocks is derived using a difference of illumination change values of the two blocks; and if only one of the two blocks is coded by IC mode, the bS of deblocking filtering for the boundary between both of the blocks is derived using the illumination change value of the block.

2. The bS derivation process of claim 1, wherein when the difference of illumination change values or the illumination change value is equal to or greater than a predetermined threshold value, bS is set as a bS of a first value, and when the difference of illumination change values or the illumination change value is less than the threshold value, bS is set as a bS of a second value which is greater than the bS of the first value.

3. The bS derivation process of claim 2, wherein the bS of the first value is identical to a bS derived when at least one of the two blocks is intra-coded and the boundary of the two blocks is not an edge of a macroblock, and the bS of the second value is identical to a bS derived when neither of the two blocks are intra-coded, neither of the two blocks contains a non-zero transformed coefficient and motion compensation for the two blocks is performed based on the identical reference frame and the absolute difference between the horizontal or vertical components of the two motion vectors of the two blocks is less than 1.

4. A deblocking filtering method comprising:
   a bS derivation process by a deblocking filtering apparatus for neighboring two blocks; and
   a process for applying filtering by the deblocking filtering apparatus with respect to pixel values of the two blocks according to the derived bS,
   wherein the bS derivation process comprises:
   determining whether at least one of two neighboring blocks is intra-coded; if neither of the blocks are intra-coded, determining whether at least one of the two blocks contains a transformed coefficient;
   if neither of the two blocks do contain a transformed coefficient, determining whether motion compensation for the two blocks is performed based on different reference frames or otherwise the absolute difference between the horizontal or vertical components of the two motion vectors of the two blocks is greater than or equal to 1; and
   if motion compensation for the two blocks is performed based on the identical reference frame and the absolute difference between the horizontal or vertical components of the two motion vectors of the two blocks is less than 1, determining whether the two blocks are coded by IC (illumination compensation) mode,
   wherein the determining whether the two blocks are coded by IC mode comprises determining whether both of the blocks are coded by IC mode and the blocks have different illumination change values, or only one of the two blocks is coded by IC, and,
   if both of the blocks are coded by IC mode and the blocks have different illumination change values, the bS of deblocking filtering for the boundary between both of the blocks is derived using a difference of illumination change values of the two blocks; and if only one of the two blocks is coded by IC mode, the bS of deblocking filtering for the boundary between both of the blocks is derived using the illumination change value of the block.

5. The deblocking filtering method of claim 4, wherein when the difference of illumination change values or the illumination change value is equal to or greater than a predetermined threshold value, bS is set as a bS of a first value; and
   when the difference of illumination change values or the illumination change value is less than the threshold value, bS is set as a bS of a second value which is greater than the bS of the first value.

6. The deblocking filtering method of claim 5, wherein the bS of the first value is identical as a bS derived when at least one of the two blocks is intra-coded and the boundary of the two blocks is not an edge of a macroblock, and the bS of the second value is identical as a bS derived when neither of the two blocks are intra-coded, neither of the two blocks contains a non-zero transformed coefficient and motion compensation for the two blocks is performed based on the identical reference frame and the absolute difference between the horizontal or vertical components of the two motion vectors of the two blocks is less than 1.

* * * * *